United States Patent
He et al.

(10) Patent No.: US 9,164,350 B2
(45) Date of Patent: Oct. 20, 2015

(54) MULTI-PORT OPTICAL CIRCULATOR SYSTEM

(71) Applicant: Skorpios Technologies, Inc., Albuquerque, NM (US)

(72) Inventors: Lina He, Albuquerque, NM (US); Amit Mizrahi, Albuquerque, NM (US)

(73) Assignee: Skorpios Technologies, Inc., Albuquerque, NM (US)

( * ) Notice: Subject to any disclaimer, the term of this patent is extended or adjusted under 35 U.S.C. 154(b) by 0 days.

(21) Appl. No.: 14/604,097

(22) Filed: Jan. 23, 2015

(65) Prior Publication Data

US 2015/0261064 A1  Sep. 17, 2015

Related U.S. Application Data

(63) Continuation of application No. 13/838,596, filed on Mar. 15, 2013, now Pat. No. 8,942,516.

(60) Provisional application No. 61/613,444, filed on Mar. 20, 2012.

(51) Int. Cl.
*G02F 1/01* (2006.01)
*G02F 1/225* (2006.01)
*G02B 6/27* (2006.01)
*G02F 1/095* (2006.01)
*G02F 1/313* (2006.01)
*G02B 27/42* (2006.01)
*G02F 1/21* (2006.01)

(52) U.S. Cl.
CPC ............ *G02F 1/2257* (2013.01); *G02B 6/2746* (2013.01); *G02B 27/4244* (2013.01); *G02F 1/0955* (2013.01); *G02F 1/3136* (2013.01); *G02F 2001/212* (2013.01)

(58) Field of Classification Search
CPC ... G02F 1/2257; G02F 1/0955; G02F 1/3136; G02B 6/2746; G02B 27/4244
USPC .......................................................... 385/1
See application file for complete search history.

(56) References Cited

U.S. PATENT DOCUMENTS 7,099,539 B1 * 8/2006 Au et al. .................. 385/45
2009/0003757 A1 * 1/2009 Mizumoto et al. .......... 385/3

* cited by examiner

*Primary Examiner* — Jerry Blevins
(74) *Attorney, Agent, or Firm* — Kilpatrick Townsend & Stockton LLP

(57) ABSTRACT

An optical circulator includes a first optical isolator including a first port and a second port and a plurality of optical isolators coupled to the second port of the first optical isolator. Each of the plurality of optical isolators comprise a first port and a second port.

15 Claims, 3 Drawing Sheets

MULTI-PORT OPTICAL CIRCULATOR SYSTEM

CROSS-REFERENCES TO RELATED APPLICATIONS

This application is a continuation of U.S. patent application Ser. No. 13/838,596, filed on Mar. 15, 2013, entitled "Multi-Port Optical Circulator System," which application claims priority to U.S. Provisional Patent Application No. 61/613,444, filed Mar. 20, 2012, entitled "Multi-Port Optical Circulator System," the disclosures of which are hereby incorporated by reference in their entirety for all purposes.

BACKGROUND OF THE INVENTION

Optical isolators are optical components that allows the transmission of light propagating in one direction, but prevent light from propagating in the opposite direction, thereby preventing unwanted feedback into the optical system.

Optical circulators are optical components that can be used to separate optical signals that travel in opposite directions. Typically, optical circulators are implemented using optical fiber and provide functionality analogous to the operation of an electronic circulator. Optical circulators can be implemented as three-port devices in which light entering at one of the three ports exits from the next port in sequence. Optical circulators are widely used in advanced communication systems and fiber-optic sensor applications.

Despite the progress made in the field of optical circulators, there is a need in the art for improved methods and systems related to optical circulators.

SUMMARY OF THE INVENTION

Embodiments of the present invention relate to optical systems. More particularly, embodiments of the present invention relate to optical isolators and optical circulators implemented using optical isolators. Embodiments of the present invention have wider applicability than this example and also include use in other opto-electronic devices.

According to an embodiment of the present invention, an optical isolator is provided. The optical isolator includes an input port and an optical splitter coupled to the input port. The optical isolator also includes a first interferometer arm having a first predetermined phase shift for a first direction of propagation and a second interferometer arm having a second predetermined phase shift for the first direction of propagation. The optical isolator further includes an optical coupler joining the first interferometer arm and the second interferometer arm, a first output port coupled to the optical coupler, and a second output port coupled to the optical coupler. Light propagating from the input port through the first interferometer arm to the first output port is in-phase with light propagating from the input port through the second interferometer arm to the first output port. Light propagating from the input port through the first interferometer arm to the second output port is out-of-phase with light propagating from the input port through the second interferometer arm to the second output port.

According to another embodiment of the present invention, an optical circulator is provided. The optical circulator includes a set of three optical isolators, each including an input/output port, an output port, and a secondary input port. The optical circulator also includes a first optical coupler joining the output port of the first optical isolator to the secondary input port of the second optical isolator, a second optical coupler joining the output port of the second optical isolator to the secondary input port of the third optical isolator, and a third optical coupler joining the output port of the third optical isolator to the secondary input port of the first optical isolator.

According to an alternative embodiment of the present invention, an optical circulator is provided. The optical circulator includes a first input/output (I/O) port and a third input/output (I/O) port. The optical circulator also includes a first waveguide including non-reciprocal material and coupled to the first I/O port and a second waveguide including non-reciprocal material and a reciprocal phase shift region and coupled to the third I/O port. The optical circulator further includes a first optical coupler coupled to the first I/O port, the third I/O port, the first waveguide, and the second waveguide. Moreover, the optical circulator includes a fourth input/output (I/O) port, a second input/output (I/O) port, and a second optical coupler coupled to the fourth I/O port, the second I/O port, the first waveguide, and the second waveguide.

According to a particular embodiment of the present invention, an optical circulator is provided. The optical circulator includes a first optical isolator including a first port and a second port and a plurality of optical isolators coupled to the second port of the first optical isolator. Each of the plurality of optical isolators includes a first port and a second port. In an embodiment, the plurality of optical isolators include two optical isolators. As an example, the first optical isolator and the plurality of optical isolators can be Mach-Zehnder optical isolators. The Mach-Zehnder optical isolators can utilize a magneto-optical material (e.g., garnet) disposed in each arm characterized by a non-reciprocal phase shift, for instance, a π/4 phase shift.

Numerous benefits are achieved by way of the present invention over conventional techniques. For example, embodiments of the present invention provide optical circulators implemented using waveguides as part of integrated opto-electronic package, for example, using silicon-on-insulator structures. These and other embodiments of the invention along with many of its advantages and features are described in more detail in conjunction with the text below and attached figures.

DETAILED DESCRIPTION OF SPECIFIC EMBODIMENTS

Integrated photonics often utilize nonreciprocal elements, such as isolators and circulators, in order to achieve advanced functionalities. Optical circulators are key components in wavelength division multiplexing (WDM) systems and bidirectional optical communications systems. Non-reciprocal elements are implemented in embodiments of the present invention with magneto-optical materials such as Garnet.

Optical circulators that can be integrated in silicon-on-insulator (SOI) platform are provided by embodiments of the present invention.

As described more fully below, embodiments provide full 3-port circulators using Mach-Zehnder interferometer configurations. In the Mach-Zehnder configurations, 3 dB couplers and/or Y-junctions may be utilized with appropriate phase adjustments.

Figure 1:
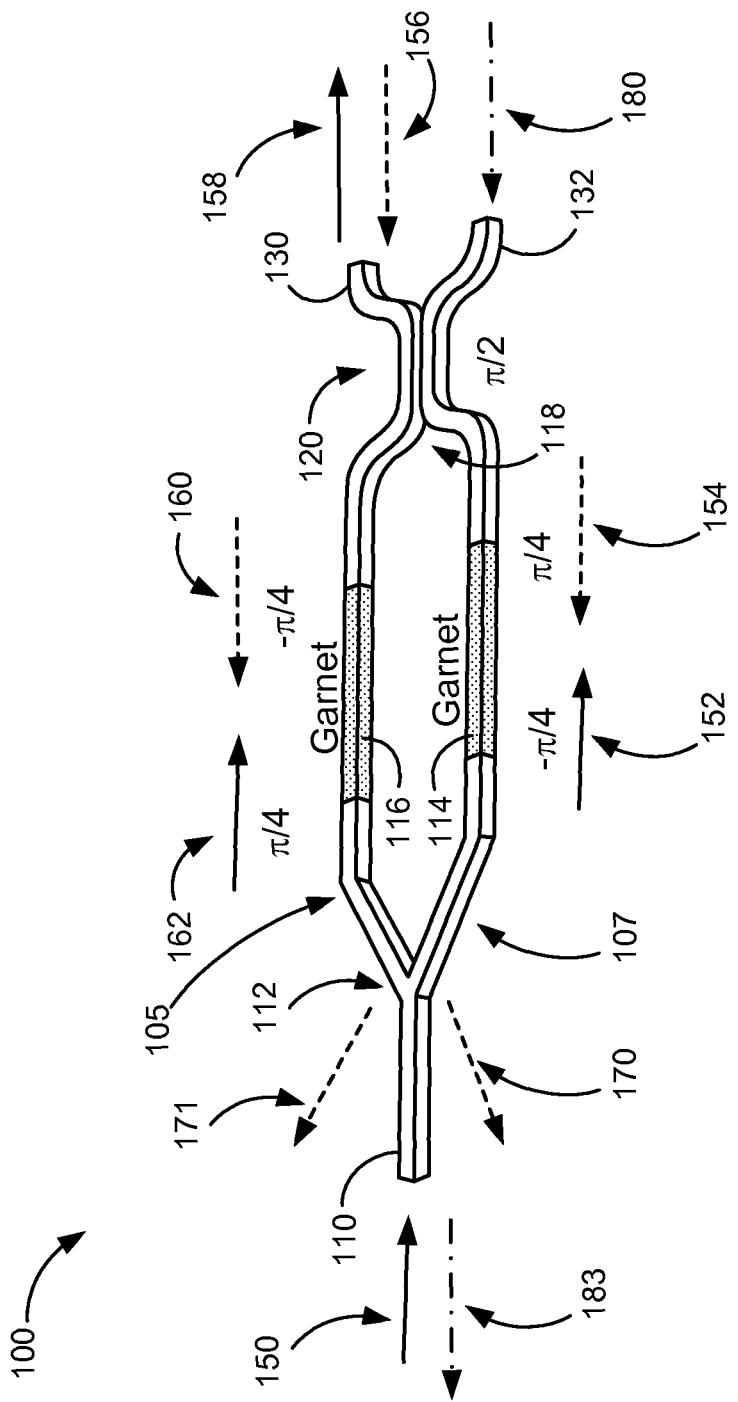
FIG. 1 is a simplified schematic diagram of an optical isolator according to an embodiment of the present invention.

FIG. 1 is a simplified schematic diagram of an optical isolator according to an embodiment of the present invention. The optical isolator 100 utilizes a Mach Zehnder structure with an input port 110, optical splitter 112, first waveguide arm 105, second waveguide arm 107, and optical coupler 118. The optical isolator is implemented as a waveguide structure, for example, a waveguide patterned in a silicon layer of a silicon-on-insulator (SOI) substrate. As will be evident to one of the skill in the art, although optical splitter 112 divides light from input port into the two arms for light propagating left to right, the optical splitter 112 can act as an optical coupler for light propagating from right to left. Similar arguments apply to optical coupler 118.

According to embodiments of the present invention, the waveguides utilized in the designs described herein can be implemented as a silicon-based waveguide inside a silicon oxide region. In some embodiments, a lateral optical confinement structure, for example, a silicon-based material having a relatively higher refractive index (i.e., a ridge guide structure), is surrounded on one or more sides by a material having a lower refractive index, such as a silicon oxide. Thus, in some embodiments, the cladding is a silicon oxide (e.g., $SiO_2$) material. In some implementations, the silicon-based material includes a single crystal silicon layer joined to an oxide layer formed through an oxide growth process, a deposition process, a bonding process, or the like. The lateral optical confinement structure can be fabricated by removing a portion of the single crystal silicon layer, for example, using an etching process, to form the ridge extending in the transverse direction and defined by a lateral width. Subsequent oxide deposition can then be performed. In another embodiment, the ridge portion could be masked and areas outside the ridge can be oxidized, the masking material can be removed, and an additional oxide deposition process can be used to complete the formation of the structure. The use of SOI materials provides the ability to integrate optical structures, such as the optically active materials described herein, with CMOS compatible structures, enabling the integration of electronic devices with optical devices. One of ordinary skill in the art would recognize many variations, modifications, and alternatives. Additional description related to waveguide structures is provided in commonly assigned U.S. Patent Application Publication No. 2013/0051727, the disclosure of which is hereby incorporated by reference in its entirety for all purposes.

In each of the waveguide arms 105 and 107, a predetermined portion of the waveguide includes a non-reciprocal material, such as garnet. Although garnet is illustrated in some embodiments, the present invention is not limited to this particular material and other materials that provide non-reciprocal phase shifts can be utilized. In some implementations, materials are utilized in which the permittivity matrix is non-isotropic, providing a non-reciprocal phase shift as a function of direction of propagation. Exemplary non-reciprocal materials include magneto-optical materials. During fabrication, a magnetic field can be applied to the non-reciprocal material to pole the material, which will then remained in the poled state after fabrication. One of ordinary skill in the art would recognize many variations, modifications, and alternatives.

As illustrated in FIG. 1, since the garnet is a non-reciprocal material, propagation through the non-reciprocal material results in different phase shifts for light propagating in different directions. In the first waveguide arm 105, light propagating to the right experiences a $\pi/4$ phase shift while light propagating to the left experiences a $-\pi/4$ phase shift. In the second waveguide arm 107, as described below, the non-reciprocal material is disposed in an opposing configuration, resulting in a $-\pi/4$ phase shift for light propagating to the right and a $\pi/4$ phase shift for light propagating to the left.

In an embodiment, to provide the non-reciprocal materials, garnet 116 is poled in a first direction and garnet 114 is poled in the first direction, providing differing (e.g., equal and opposite) phase shifts as light propagates through the two waveguide arms in opposite directions. In the embodiment illustrated in FIG. 1, the length of the non-reciprocal material (e.g., garnet) is provided such that there is a nonreciprocal phase shift of $\pi/4$ in one direction and $-\pi/4$ in the other direction as illustrated by the phase accruals associated with the illustrated light rays. Alternatively, the phase shifts introduced by the non-reciprocal material (and other waveguide sections) could be any phase shift that results in a total different of $\pi/2$ between the two arms.

Although FIG. 1 illustrates the non-reciprocal material being integrated into the waveguide structure and present in the waveguide arms, this is not required by embodiments of the present invention. In some implementations, the non-reciprocal material is disposed adjacent to the waveguide (e.g., to the sides of the waveguide, above the waveguide, or the like) and introduces phase accrual through evanescent coupling with the optical mode propagating in the waveguide, or through a super-mode generated by the two materials. The thickness of the silicon layer (e.g., a single crystal silicon layer) can vary over a range, for example, from 100 nm to 3 μm, for instance between 100 nm and 1 μm. The length of the waveguide associated with the non-reciprocal material can vary depending on the materials used, the desired phase shift, the waveguide structure, and the like. As an example, implementations using garnet as the non-reciprocal material can be on the order of several hundred microns.

Referring to FIG. 1, light ray 150 entering at input port 110 is split by the optical splitter into first waveguide arm 105 and second waveguide arm 107. The optical splitter can be any suitable splitter, including a 3 dB coupler with appropriate compensation for the phase shift.

Light propagating from the left to the right in the first waveguide arm will experience a phase shift of $\pi/4$ as indicated by light ray 162. Light propagating from the left to the right in the second waveguide arm will experience a phase shift of $-\pi/4$ as indicated by light ray 152. Accordingly, as light in each arm propagating to the right reaches optical coupler 118, the light in the first waveguide arm will be advanced by a $\pi/2$ phase shift with respect to light in the second waveguide arm.

As the light propagates through the waveguide coupler 120, light passing from the first waveguide arm 105 to the output port 130 experiences no substantial phase shift. On the other hand, light passing from the second waveguide arm 107 to the output port 130 experiences a $\pi/2$ phase shift. Similar description applies to light passing from the waveguide arms to the other port 132, which, as explained more fully below, is referred to as a secondary input port.

Starting at input port 110, light propagating in the first waveguide arm experiences a phase shift of $\pi/4$ and no substantial phase shift passing through optical coupler 120, exiting output port 130 with a π/4 phase. Light propagating in the second waveguide arm experiences a phase shift of −π/4 and a π/2 phase shift passing through optical coupler 120 to the output port 130, exiting output port 130 with a π/4 phase, thereby in phase with the light from the first waveguide arm. Accordingly, constructive interference results in optical output at the output port 130 as illustrated by output ray 158 exiting from output port 130.

In contrast with this constructive interference, light entering at input port 110 destructively interferes at the secondary input port 132 since light passing through the first waveguide arm and the optical coupler experiences a phase shift of π/4 plus π/2 (i.e., 3π/4) and light passing through the first waveguide arm to the secondary input port 132 experiences a phase shift of −π/4, thereby π out of phase with respect to each other. Accordingly, no output light is illustrated exiting secondary input port 132.

The operation of the optical isolator 100 in the reverse direction is as follows. Light entering the output port 130 from right to left (light ray 156), experiences a phase shift of −π/4 (light ray 160) in the first waveguide arm 105 and is characterized by a −π/4 phase shift approaching optical splitter 112 (now serving as an optical coupler in the reverse direction). Light passing through optical coupler 120 from output port 130 to the second waveguide arm 107, experiences a phase shift of π/2 passing through optical coupler 120 and a phase shift of π/4 (light ray 154) in the second waveguide arm 107 and is characterized by a 3π/4 phase shift approaching optical splitter 112. Accordingly, destructive interference at optical splitter 112 is illustrated by rays 170 and 171.

Light entering the secondary input port 132 from right to left (light ray 180 represented by a dashed and dotted line), experiences a phase shift of π/2 passing through optical coupler 120 from secondary input port 132 to the first waveguide arm 105, experiences a phase shift of −π/4 (light ray 160) in the first waveguide arm 105 and is characterized by a π/4 phase shift approaching optical splitter 112. Light entering the secondary input port 132 from right to left experiences a phase shift of π/4 (light ray 1654) in the second waveguide arm 107 and is characterized by a π/4 phase shift approaching optical splitter 112. Accordingly, constructive interference at the exit of input port 110 is illustrated by light ray 183 (also represented by a dashed and dotted line) exiting input port 110 to the left. Thus, input port 110 can be referred to as an input/output (I/O) port since light entering at I/O port 110 exits at output port 130 and light entering at secondary input port 132 exits at I/O port 110.

Figure 2:
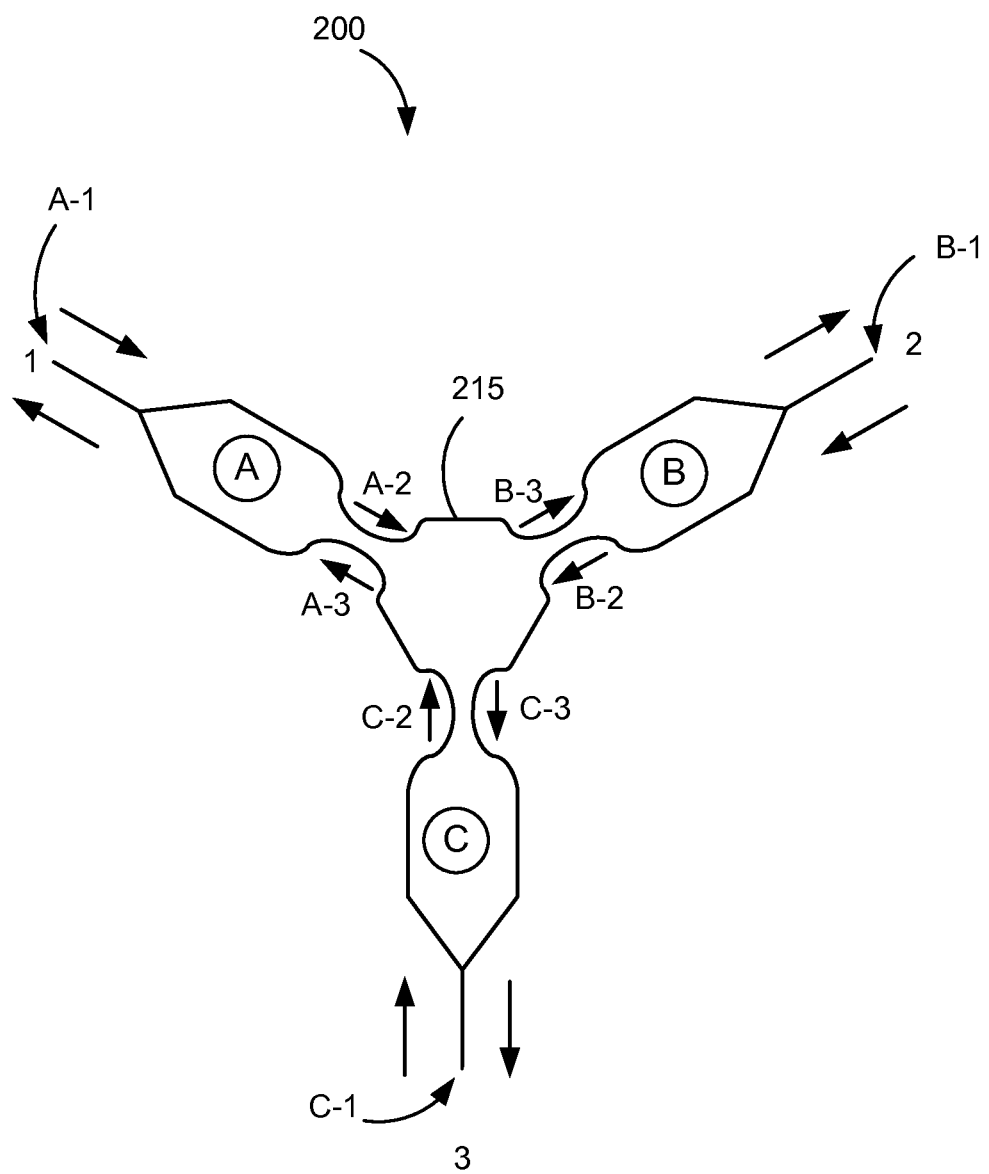
FIG. 2 is a simplified schematic diagram illustrating a three-port optical circulator according to an embodiment of the present invention.

FIG. 2 is a simplified schematic diagram illustrating a multi-port optical circulator according to an embodiment of the present invention. As illustrated in FIG. 2, the multi-port optical circulator 200 includes three optical isolators 100 as described in relation to FIG. 1 coupled to each other in a predetermined configuration. Accordingly, this implementation can be referred to as a three-port optical circulator. The multi-port optical circulator 200 provides Port transitions 1→2→3→1.

Referring to optical isolator A in FIG. 2, light injected at I/O port A-1 (also referred to as Port 1) passes through the interferometer arms and constructively interferes at output port A-2. A waveguide coupler 215 is provided to couple light exiting at output port A-2 to secondary input port B-3. The light entering at secondary input port B-3 passes through the interferometer arms of optical isolator B to exit at I/O port B-1 (also referred to as Port 2).

Light injected at I/O port B-1 (Port 2) passes through the interferometer arms and constructively interferes at output port B-2. A waveguide coupler couples the light exiting at output port B-2 to secondary input port C-3. The light entering at secondary input port C-3 passes through the interferometer arms of optical isolator C to exit at I/O port C-1 (also referred to as Port 3). Light injected at I/O port C-1 (Port 3) passes through the interferometer arms and constructively interferes at output port C-2. A waveguide coupler couples the light exiting at output port C-2 to secondary input port A-3. The light entering at secondary input port A-3 passes through the interferometer arms of optical isolator A to exit at I/O port A-1 (Port 1). Accordingly, Port transitions 1→2→3→1 are provided by the embodiment illustrated in FIG. 2.

It can be noted that for light input at I/O port A-1, destructive interference results in no output at port A-3. Accordingly, the device acts as an optical circulator with the port transitions described herein.

Figure 3:
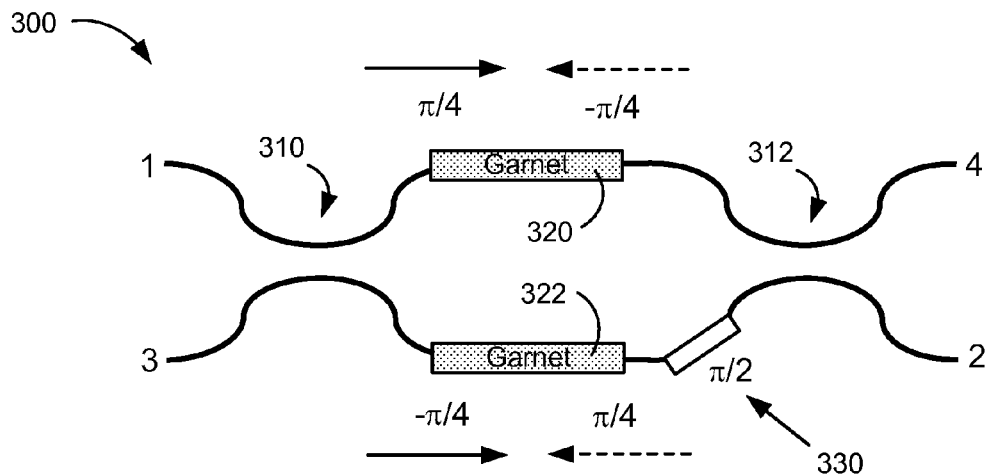
FIG. 3 is a simplified schematic diagram illustrating a four-port optical circulator according to an embodiment of the present invention.

FIG. 3 is a simplified schematic diagram illustrating a four-port optical circulator according to an embodiment of the present invention. The four-port optical circulator 300 includes four I/O ports 1, 2, 3, and 4 that support Port transitions 1→2→3→4→1. I/O ports 1 and 3 are coupled through optical coupler 310 (analogous to optical coupler 120 in FIG. 1) to the interferometer arms, which include the non-reciprocal material 320 and 322 (illustrated as garnet). I/O ports 4 and 2 are coupled through optical coupler 312 to the interferometer arms. As discussed in relation to optical coupler 120, optical couplers 310 and 312 introduce a predetermined phase shift (e.g., π/2 phase shift) when light propagates from one of the I/O ports to an opposing waveguide arm of the interferometer and vice versa. As an example, light propagating from I/O port 1 to the interferometer arm including non-reciprocal material 322 experiences a π/2 phase shift in some embodiments.

During operation, light injected at I/O port 1 experiences a π/4 phase shift passing through non-reciprocal material 320 and a π/2 phase shift passing to I/O port 2, thereby accumulating a phase shift of 3π/4. Light passing through the other arm of the interferometer experiences a π/2 phase shift passing into the other arm, a −π/4 phase shift passing through non-reciprocal material 322, and a π/2 phase shift passing to reciprocal phase shifter 330, thereby accumulating a phase shift of 3π/4. Accordingly, the constructive interference produces an output at I/O port 2. Similar operating principles can be used to track light propagation around the four-port optical circulator to achieve Port transitions 1→2→3→4→1. The reciprocal phase shifter 330 can be implemented using a variety of structures, including resistive heaters, diode structures and the like. A variety of carrier effects can be utilized, including formation of a depletion region or formation of an accumulation region in the waveguide and/or the material in the vicinity of the waveguide. Additionally, in addition to carrier injection, thermal modification of the phase can be applied to the waveguides to introduce phase delay in the waves propagating in the waveguide. One of ordinary skill in the art would recognize many variations, modifications, and alternatives. Additional description related to phase control is provided in commonly assigned U.S. patent application Ser. No. 13/605,633, filed on Sep. 6, 2012, the disclosure of which is hereby incorporated by reference in its entirety for all purposes.

Figure 4:
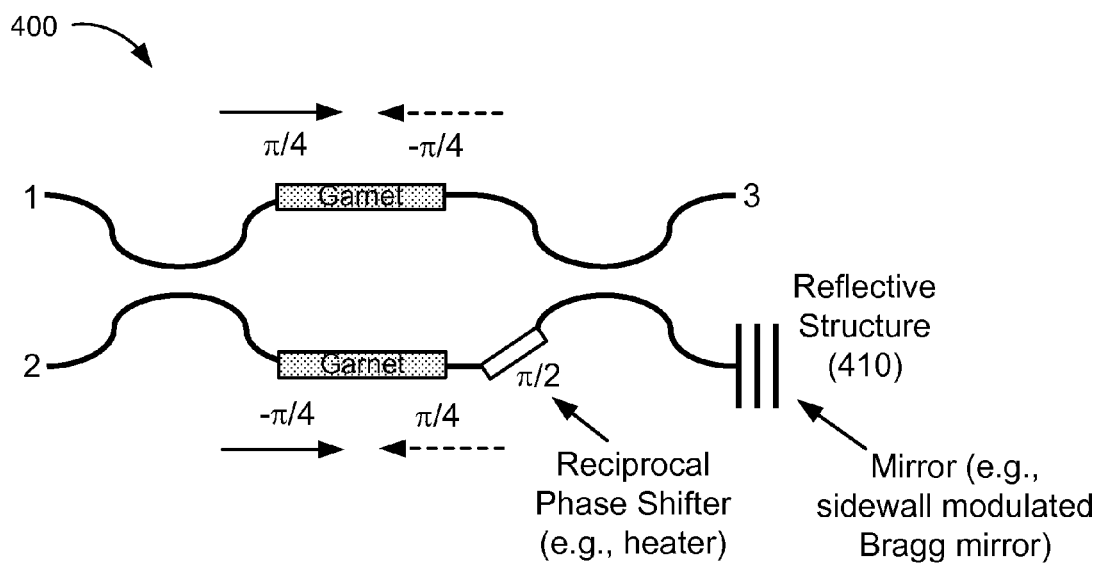
FIG. 4 is a simplified schematic diagram illustrating a three-port optical circulator according to an alternative embodiment of the present invention.

FIG. 4 is a simplified schematic diagram illustrating a three-port optical circulator according to an alternative embodiment of the present invention. Based on the four-port optical circulator illustrated in FIG. 3, a reflective structure 410 has been added to the I/O port 2 illustrated in FIG. 3. As a result, the three-port optical circulator 400 achieves Port transitions 1→2→3→1. The reflective structure 410 can be distributed feedback (DFB) gratings, Bragg gratings, sidewall modulated waveguides, or other suitable reflectors. If periodic reflectors are used for the mirror, strong reflection occurs at wavelengths within the stopband of the reflector. Wavelengths outside this stopband will be transmitted through the reflector, where the light may be scattered out using a suitable waveguide termination so as to avoid reflection.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An optical circulator comprising:
    a first input/output (I/O) port;
    a second input/output (I/O) port;
    a first waveguide including non-reciprocal material and coupled to the first I/O port;
    a second waveguide including non-reciprocal material and a reciprocal phase shift region and coupled to the second I/O port;
    a first optical coupler coupled to the first I/O port, the second I/O port, the first waveguide, and the second waveguide, wherein the first optical coupler is operable to introduce a $\pi/2$ phase shift for light propagating from the first I/O port to the second waveguide;
    a third input/output (I/O) port;
    a reflective structure; and
    a second optical coupler coupled to the third I/O port, the reflective structure, the first waveguide, and the second waveguide, wherein:
        the second optical coupler is operable to introduce a $\pi/2$ phase shift for light propagating from the first waveguide to the reflective structure; and
        the second optical coupler introduces no substantial phase shift for light propagating from the first waveguide to the third I/O port, and the second optical coupler introduces no substantial phase shift for light propagating from the second waveguide to the reflective structure.

2. The optical circulator of claim 1 wherein the first optical coupler is operable to introduce a $\pi/2$ phase shift for light propagating from the second I/O port to the first waveguide.

3. The optical circulator of claim 1 wherein the second optical coupler is operable to introduce a $\pi/2$ phase shift for light propagating from the third I/O port to the second waveguide.

4. The optical circulator of claim 1 wherein the non-reciprocal material in the first waveguide and the non-reciprocal material in the second waveguide comprise a magneto-optical material.

5. The optical circulator of claim 4 wherein the magneto-optical material comprises garnet.

6. The optical circulator of claim 5 wherein the non-reciprocal material in the first waveguide is operable to introduce a $\pi/4$ phase shift for light propagating in a first direction and the non-reciprocal material in the second waveguide is operable to introduce a $-\pi/4$ phase shift for light propagating in the first direction.

7. The optical circulator of claim 6 wherein the non-reciprocal material in the first waveguide is operable to introduce a $-\pi/4$ phase shift for light propagating in a second direction opposing the first direction and the non-reciprocal material in the second waveguide is operable to introduce a $\pi/4$ phase shift for light propagating in the second direction.

8. The optical circulator of claim 1 wherein the first optical coupler and the second optical coupler comprise waveguide couplers.

9. The optical circulator of claim 1 wherein the second waveguide further includes a reciprocal phase shift region operable to introduce a $\pi/2$ phase shift.

10. The optical circulator of claim 1 wherein the second optical coupler introduces no substantial phase shift for light propagating from the first waveguide to the third I/O port and the second optical coupler introduces no substantial phase shift for light propagating from the second waveguide to the reflective structure.

11. The optical circulator of claim 1 wherein the reflective structure is a distributed feedback (DFB) grating.

12. The optical circulator of claim 1 wherein the reflective structure is a Bragg grating.

13. The optical circulator of claim 1 wherein the reflective structure is a side-wall modulated waveguide.

14. The optical circulator of claim 1 wherein the reflective structure comprises a periodic reflector characterized by a stop band.

15. The optical circulator of claim 14 wherein light having a wavelength outside the stopband of the periodic reflector is transmitted through the reflective structure and out of the circulator.

* * * * *